United States Patent
Hatakeyama

(10) Patent No.: US 10,450,913 B2
(45) Date of Patent: Oct. 22, 2019

(54) EXHAUST GAS PURIFYING DEVICE OF INTERNAL COMBUSTION ENGINE

(71) Applicant: HONDA MOTOR CO., LTD., Tokyo (JP)

(72) Inventor: Yoshiaki Hatakeyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/128,694

(22) Filed: Sep. 12, 2018

(65) Prior Publication Data

US 2019/0078477 A1 Mar. 14, 2019

(30) Foreign Application Priority Data

Sep. 13, 2017 (JP) .................. 2017-176010

(51) Int. Cl.
| | |
|---|---|
| F01N 3/021 | (2006.01) |
| F01N 3/035 | (2006.01) |
| F01N 3/28 | (2006.01) |
| F01N 3/022 | (2006.01) |
| B01D 53/94 | (2006.01) |
| B01D 46/00 | (2006.01) |
| B01D 46/24 | (2006.01) |
| B01J 35/04 | (2006.01) |

(52) U.S. Cl.
CPC ........ *F01N 3/0211* (2013.01); *B01D 46/0027* (2013.01); *B01D 46/2422* (2013.01); *B01D 46/2455* (2013.01); *B01D 53/945* (2013.01); *B01D 53/9454* (2013.01); *B01J 35/04* (2013.01); *F01N 3/0222* (2013.01); *F01N 3/035* (2013.01); *B01D 2255/915* (2013.01); *B01D 2255/9155* (2013.01); *B01D 2265/04* (2013.01); *B01D 2279/30* (2013.01); *F01N 2330/06* (2013.01); *F01N 2330/30* (2013.01); *F01N 2510/06* (2013.01)

(58) Field of Classification Search
None
See application file for complete search history.

(56) References Cited

U.S. PATENT DOCUMENTS

2016/0348552 A1* 12/2016 Hatakeyama ......... F01N 3/0222

FOREIGN PATENT DOCUMENTS

JP 2016-217305 A 12/2016

\* cited by examiner

*Primary Examiner* — Jelitza M Perez
(74) *Attorney, Agent, or Firm* — Westerman, Hattori, Daniels & Adrian, LLP

(57) ABSTRACT

An exhaust gas purifying device includes: a columnar honeycomb carrier provided in an exhaust channel; a tubular case member housing the honeycomb carrier; and a retaining member surrounding the outer circumference of the honeycomb carrier. The honeycomb carrier has, in the outer circumferential edge of an inlet-side end face and an outlet-side end face, respectively, sloped surfaces sloped toward a direction in which the length in the center axis direction of the honeycomb carrier decreases. Of the retaining member, ends in the center axis direction of the honeycomb carrier extend to the sloped surfaces of the honeycomb carrier, and the ends have tapered parts which are longer in the center axis direction of the honeycomb carrier on the side facing the case member than on the side facing the honeycomb carrier.

7 Claims, 6 Drawing Sheets

EXHAUST GAS PURIFYING DEVICE OF INTERNAL COMBUSTION ENGINE

CROSS REFERENCES TO RELATED APPLICATIONS

The present application claims priority under 35 U.S.C. § 119 to Japanese Patent Application No. 2017-176010, filed Sep. 13, 2017, entitled "EXHAUST GAS PURIFYING DEVICE OF INTERNAL COMBUSTION ENGINE." The contents of this application are incorporated herein by reference in their entirety.

TECHNICAL FIELD

The present disclosure relates to an exhaust gas purifying device of an internal combustion engine.

BACKGROUND

Heretofore, an exhaust gas purifying device provided in an exhaust channel of an internal combustion engine has included a carrier (honeycomb carrier) on which an exhaust gas purifying catalyst is supported, and a tubular case member that houses the carrier. Upon housing the carrier inside the case member, it is important to reliably retain the carrier inside the case member. To retain the carrier inside the case member, a method is sometimes adopted which provides a sloped part where a circumferential face of the case member near each of openings on the exhaust gas-inlet and outlet sides of the case member is narrowed in such a manner as to reduce the diameter toward an open end. In this case, the corresponding carrier side is also provided with a chamfered part, which is a sloped surface corresponding to the sloped part of the case member. The chamfered part on the carrier side is caught on a sloped part-inner face of the case member, whereby the position of the carrier inside the case member is retained.

In order to reliably retain the carrier inside the case member, it has been known to interpose a retaining member commonly called a mat between a case member inner circumferential face and a carrier outer circumferential face. The retaining member needs to have power for retaining the position of the carrier, and resistance to wind erosion occurring from exposure to an exhaust gas flow. If an end of the retaining member is sufficiently recessed from each of positions on the inlet-side end face and outlet-side end face of the carrier, wind erosion is suppressed, as a matter of course. However, recession of the end of the retaining member reduces the carrier position-retaining power of the retaining member, and impairs the original function of the retaining member. Meanwhile, a clogging may be provided in a region having a constant width on the outer circumferential side of the carrier, to sufficiently suppress occurrence of wind erosion of the retaining member. However, the clogging part reduces the effective volume of the carrier.

The present applicant has proposed a technique for solving the above problem (e.g., Japanese Patent Application Publication No. 2016-217305). In the technique of Japanese Patent Application Publication No. 2016-217305, a reduced-diameter part having a smaller inner diameter than the outer diameter of a center part of the aforementioned inlet-side end face of the carrier is formed, near each of the openings on the exhaust gas inlet and outlet sides of the case member. Wind erosion of the retaining member is suppressed by narrowing the exhaust gas stream at the reduced-diameter part. The technique also ensures retention of the carrier inside the case member.

SUMMARY

In the technique of Japanese Patent Application Publication No. 2016-217305, the retaining power of the retaining member is not necessarily sufficient.

It is desirable to provide an exhaust gas purifying device of an internal combustion engine that includes a retaining member capable of ensuring sufficient power to retain a carrier.

The following technique is proposed to achieve the above objective.

(1) An exhaust gas purifying device (e.g., later-mentioned exhaust gas purifying device 1) of an internal combustion engine provided in an exhaust channel of an internal combustion engine to purify exhaust gas of the internal combustion engine, the exhaust gas purifying device including: a columnar honeycomb carrier (e.g., later-mentioned honeycomb carrier 11) in which multiple cells extending from an exhaust gas inlet-side end face (e.g., later-mentioned inlet-side end face 110*a*) to an outlet-side end face (e.g., later-mentioned outlet-side end face 110*b*) and serving as exhaust gas passages are separated and formed by a porous partition wall; a tubular case member (e.g., later-mentioned case member 12) that houses the honeycomb carrier; and a retaining member (e.g., later-mentioned retaining member 13) that surrounds the outer circumference of the honeycomb carrier between the honeycomb carrier and the case member, in which: the honeycomb carrier has, in an outer circumferential edge of each of the inlet-side end face and the outlet-side end face, a sloped surface (e.g., later-mentioned sloped surfaces 112*a*, 112*b*) sloped toward a direction in which the length in a center axis (e.g., later-mentioned center axis X) direction of the honeycomb carrier decreases; and of the retaining member, an end (e.g., later-mentioned ends 13*a*, 13*b*) in the center axis direction of the honeycomb carrier extends to the sloped surface of the honeycomb carrier, and the end forms a tapered part (e.g., later-mentioned tapered parts 130*a*, 130*b*) which is longer in the center axis direction of the honeycomb carrier on a side facing the case member than on a side facing the honeycomb carrier.

In the exhaust gas purifying device of an internal combustion engine of (1) described above, the end of the retaining member forms a tapered part and extends to the sloped surface of the honeycomb carrier. Hence, the retaining member can firmly retain the honeycomb carrier in the inner diameter direction and the center axis direction.

(2) The exhaust gas purifying device of an internal combustion engine of (1), in which an end face (e.g., later-mentioned end faces 131*a*, 131*b*) of the retaining member is substantially parallel to the center axis direction of the honeycomb carrier.

In the exhaust gas purifying device of an internal combustion engine of (2) described above, in the exhaust gas purifying device of an internal combustion engine of (1) described above, particularly, an end face of the retaining member is substantially parallel to the center axis of the honeycomb carrier. Hence, when the honeycomb carrier is retained by the sloped part of the case member with the retaining member interposed therebetween, collision of the exhaust gas stream into the retaining member can be avoided reliably, while ensuring the maximum so-called overlap allowance, which is a part to be caught when the honeycomb carrier is retained.

The present disclosure can implement an exhaust gas purifying device of an internal combustion engine that includes a retaining member capable of ensuring sufficient power to retain a carrier and reliably avoiding collision with an exhaust gas stream. In the above explanation of the exemplary embodiment, specific elements with their reference numerals are indicated by using brackets. These specific elements are presented as mere examples in order to facilitate understanding, and thus, should not be interpreted as any limitation to the accompanying claims.

DETAILED DESCRIPTION

Hereinafter, an embodiment of the present disclosure will be described in detail with reference to the drawings, to clarify the present disclosure.

Figure 1:
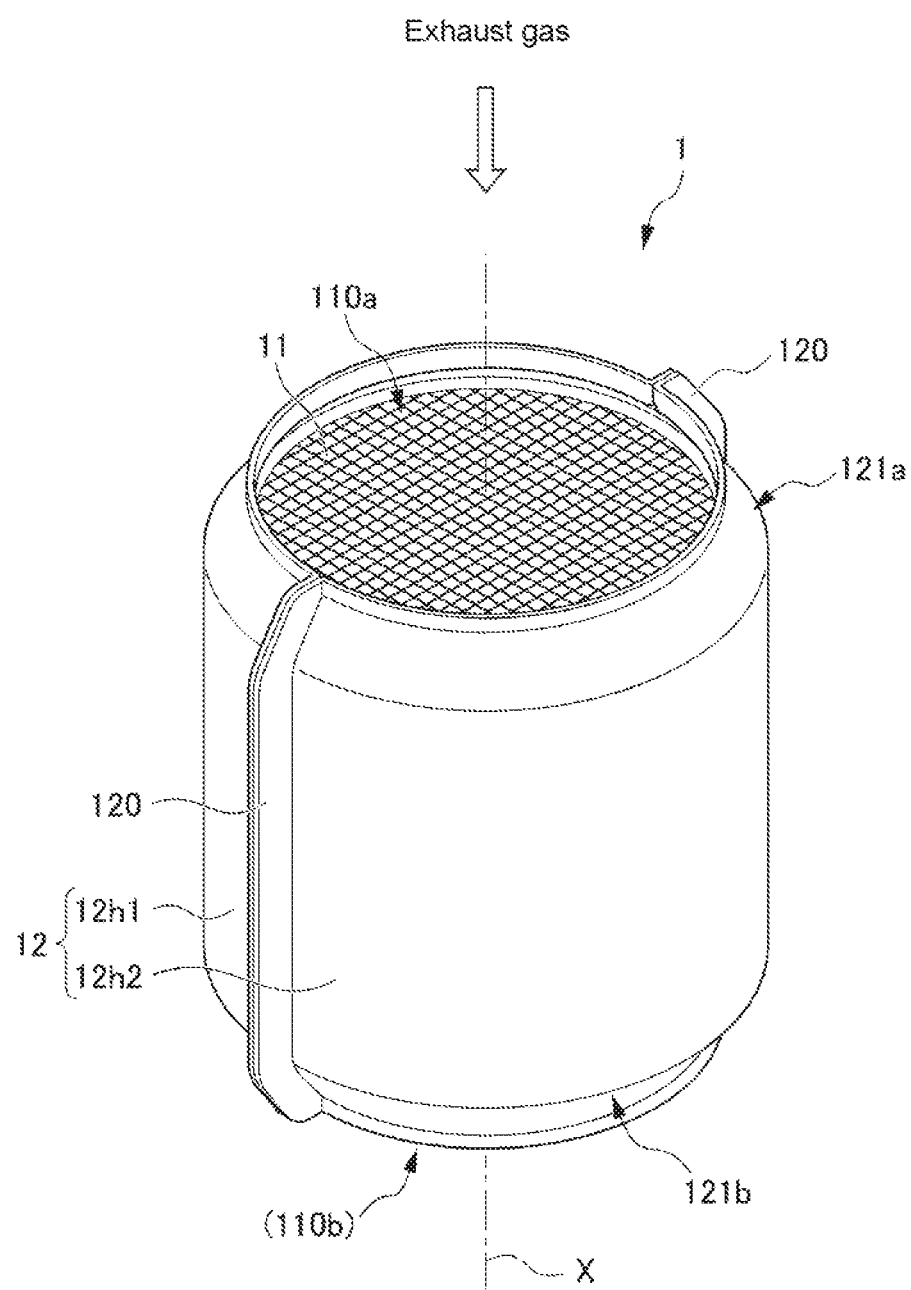
FIG. 1 is a perspective view of an exhaust gas purifying device of an internal combustion engine of an embodiment of the present disclosure.

FIG. 1 is a perspective view of an exhaust gas purifying device of an internal combustion engine of an embodiment of the present disclosure. An exhaust gas purifying device 1 of an internal combustion engine of the embodiment is provided in an exhaust pipe of an unillustrated internal combustion engine, and is a gasoline particulate filter (hereinafter referred to as "GPF.") that collects particulate matter (hereinafter referred to as "PM.") in exhaust gas flowing through the exhaust pipe.

In one mode, the exhaust gas purifying device 1 is provided in an exhaust pipe that extends downward along a side face on the vehicle front side of an unillustrated gasoline engine, directly below the gasoline engine. Specifically, the exhaust gas purifying device 1 is provided in the exhaust pipe with the exhaust gas flow direction pointed downward.

As illustrated in FIG. 1, the exhaust gas purifying device 1 includes a honeycomb carrier 11 and a case member 12.

The honeycomb carrier 11 has multiple cells that penetrate and extend from an exhaust gas inlet-side end face 110a to outlet-side end face 110b (unillustrated in FIG. 1), which are one and the other end faces (see FIG. 2) in a center axis X direction, to serve as exhaust passages, and a porous partition wall that separates and forms the cells.

The honeycomb carrier 11 is formed into a cylinder having a circular section. Note, however, that the honey comb carrier may be in any shape as long as it is columnar, and its radial section may be formed into an oval or a shape including multiple arcs, for example.

Although each cell is formed into a square pole having a square section, the section may be a polygonal shape, for example.

The honeycomb carrier 11 is formed of a porous fire resistant ceramics made of cordierite. The honeycomb carrier 11 made of cordierite is obtained by being integrally formed by extrusion molding, and then being subjected to firing. The outer cover is simultaneously formed while firing. Accordingly, since an outer circumferential face of the honeycomb carrier 11 of the embodiment is covered with an outer cover, a catalyst does not leak from the outer circumferential face during a catalyst supporting step, and exhaust gas does not leak from the outer circumferential face during use.

The diameter of a void (pore) of the honeycomb carrier 11 and the void content (porosity) are appropriately set within a range where the partition wall functions as a filter material that filters PM in exhaust gas.

An exhaust gas purifying catalyst for purifying exhaust gas is supported on the honeycomb carrier 11. Specifically, a three-way catalyst that purifies HC, CO, $NO_x$ in exhaust gas is supported on the honeycomb carrier 11 of the embodiment. As the three-way catalyst, a substance including at least one precious metal from among Pt, Pd, and Rh is preferably used.

The case member 12 is formed into a cylinder having a circular section, and houses therein the aforementioned honeycomb carrier 11. Note, however, that the case member 12 may be in any shape as long as it is a tube that follows the shape of the honeycomb carrier 11, and its radial section may be formed into an oval ring or a shape including multiple circular rings, for example.

The case member 12 is configured of metal such as SUS, for example.

The case member 12 is a clamshell case member configured of case half bodies 12h1, 12h2 divided in the circumferential direction along the center axis X direction (vertical direction in FIG. 1) of the case member 12. As illustrated in FIG. 1, the case member 12 is integrated by butt-welding the case half bodies 12h1, 12h2 divided into two, at extension parts 120, 120.

Note that the extension parts 120, 120 are formed by bending circumferential edges of the case half bodies outward into a flange shape, and butt-welding the edges.

As illustrated in FIG. 1, the case member 12 has sloped parts 121a, 121b whose diameters are reduced toward openings on the exhaust gas inlet and outlet sides, respectively.

Figure 2:
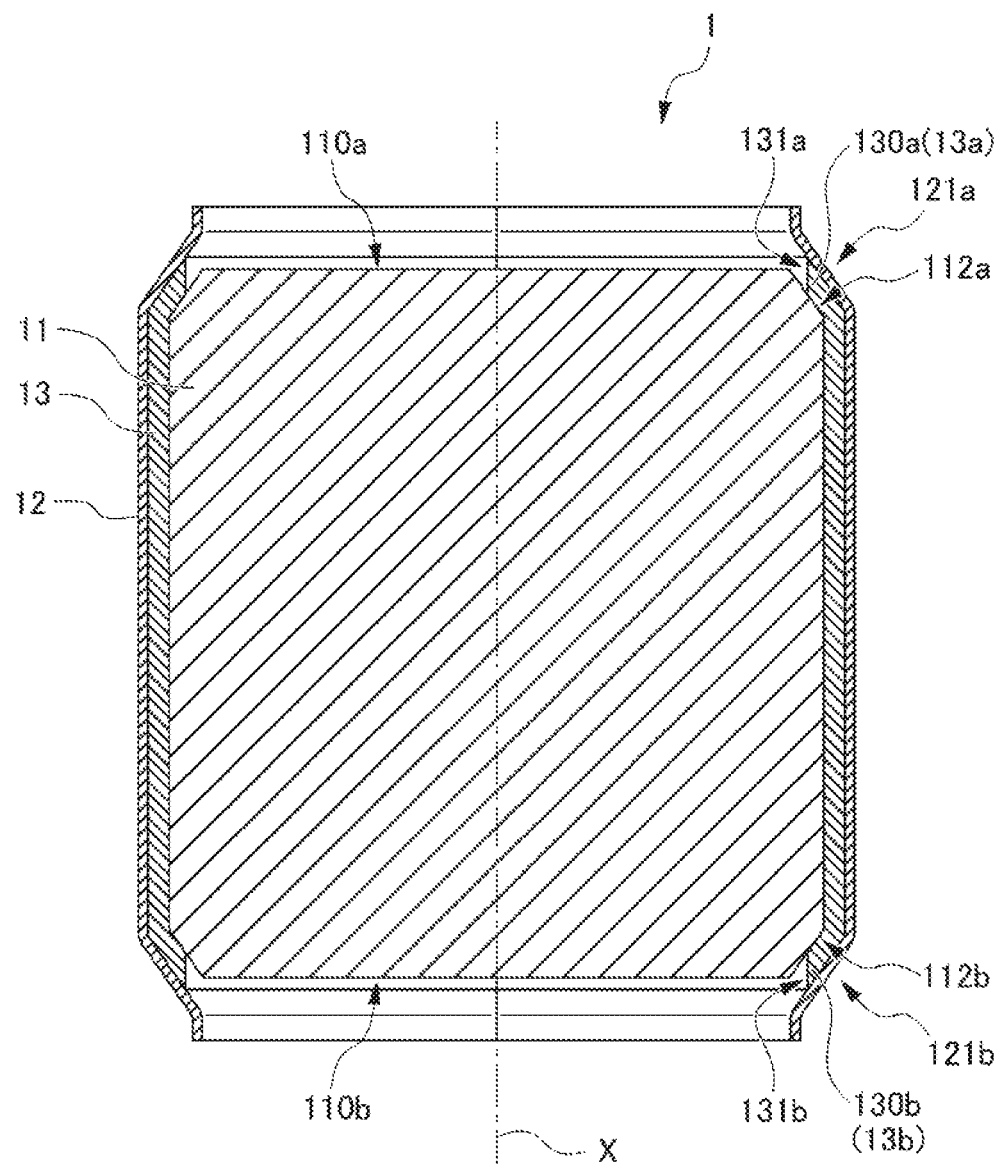
FIG. 2 is an axial cross-section of the exhaust gas purifying device of FIG. 1.

Next, the exhaust gas purifying device of an internal combustion engine of the embodiment of the present disclosure will be describe in further detail, with reference to FIG. 2 as well as FIG. 1.

FIG. 2 is an axial cross-section of the exhaust gas purifying device of FIG. 1.

In FIGS. 1 and 2, corresponding parts are assigned the same reference numerals.

As illustrated in FIG. 2, the honeycomb carrier 11 having a substantially cylindrical external shape is housed inside the case member 12, with a mat-shaped retaining member 13 interposed therebetween. The retaining member 13 surrounds the outer circumference of the honeycomb carrier 11 between the honeycomb carrier 11 and the case member 12, and retains the position of the honeycomb carrier 11 in a predetermined normal position inside the case member 12. The honeycomb carrier 11 has, in the outer circumferential edge of the inlet-side end face 110a and the outlet-side end face 110b, respectively, sloped surfaces 112a, 112b sloped toward directions in which the length in the center axis X direction of the honeycomb carrier 11 decreases. As can be seen in FIGS. 1 and 2, the sloped surfaces 112a, 112b are formed in a chamfered shape on the outer circumferential edges of the inlet-side end face 110a and the outlet-side end face 110b of the honeycomb carrier 11, respectively. The retaining member 13 is housed inside the case member 12 while the retaining member 13 is wound around substantially the entire outer circumferential face including the sloped surfaces 112a, 112b of the honeycomb carrier 11.

The case member 12 is formed along the external shape of the honeycomb carrier 11, and its both end sides in the center axis X direction, that is, the inlet end side and the outlet end side of the exhaust gas flow, respectively form the sloped parts 121a, 121b sloped in cross-sectional view such that the diameters gradually decrease toward the ends. The position, shape, size of the sloped parts 121a, 121b are selected and formed in correspondence with the sloped surfaces 112a, 112b of the honeycomb carrier 11. The honeycomb carrier 11 housed in the case member 12 described above is held inside the case member 12, since the sloped surfaces 112a, 112b of the honeycomb carrier are caught on inner walls of the sloped parts 121a, 121b of the case member 12 with the retaining member 13 interposed therebetween.

The retaining member 13 is interposed between the honeycomb carrier 11 and the inner wall of the case member 12 in such a manner as to surround the outer circumferential face of the honeycomb carrier 11, and retains a predetermined normal position of the honeycomb carrier 11 inside the case member 12. As the retaining member 13, a material having heat resistance, vibration resistance, and a sealing property is used. Specifically, a ceramic fiber such as alumina fiber, silica fiber, alumina-silica fiber, and glass-ceramic fiber, or metal mesh is used, for example.

Next, the embodiment of the present disclosure will be described in further detail with reference to FIG. 3 as well as FIG. 2.

Figure 3:
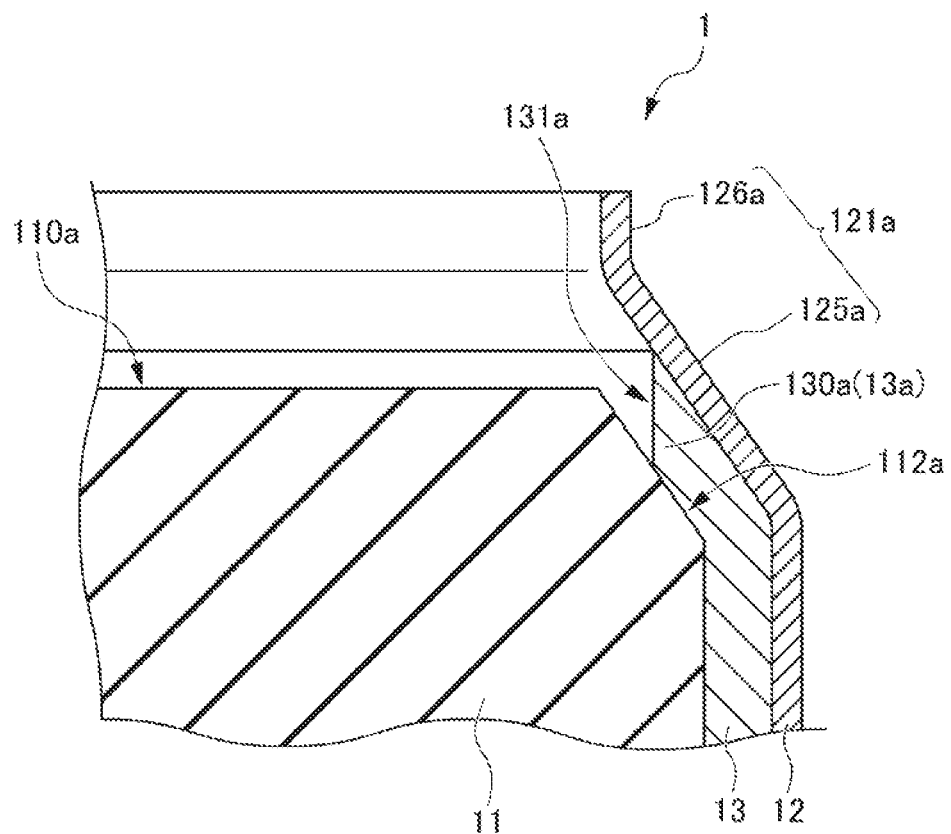
FIG. 3 is a partial enlargement of the exhaust gas purifying device of FIG. 2.

FIG. 3 is a partial enlargement of the exhaust gas purifying device of FIG. 2.

As can be seen in FIGS. 2 and 3, of the retaining member 13, ends 13a, 13b in the direction of the center axis X of the honeycomb carrier 11 extend to the sloped surfaces 112a, 112b of the honeycomb carrier 11, and the ends 13a, 13b form tapered parts 130a, 130b which are longer on the side facing the case member 12 than on the side facing the honeycomb carrier 11. End faces 131a, 131b of the tapered parts 130a, 130b facing the inner diameter side of the case member 12 are substantially parallel to the center axis X.

That is, the end faces 131a, 131b of the tapered parts 130a, 130b are substantially parallel to the center axis X, when the retaining member 13 is placed between the honeycomb carrier 11 and the case member 12 as illustrated in FIG. 2.

Figure 4:
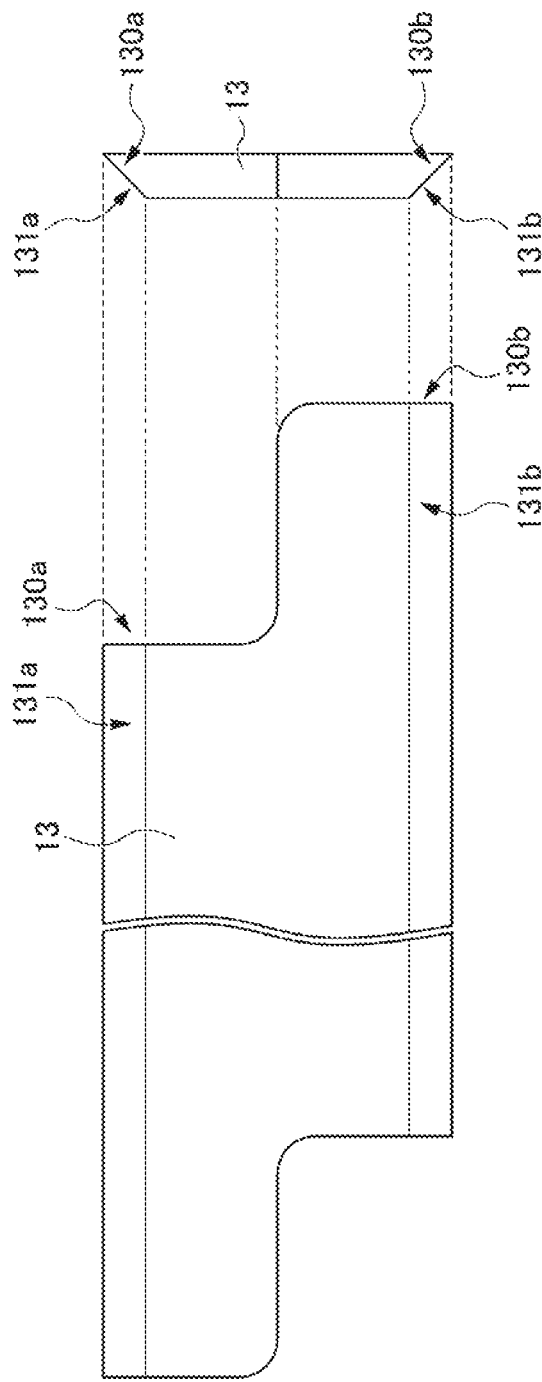
FIG. 4 is an explanatory drawing of a retaining member used in the exhaust gas purifying device of FIG. 2.

FIG. 4 is an explanatory drawing of the retaining member used in the exhaust gas purifying device of FIG. 2.

FIG. 4 illustrates the aforementioned retaining member 13 as viewed from the end side and in a developed manner, with corresponding dimensional relations connected with a broken line.

When the retaining member 13 is developed as in FIG. 4, the end faces 131a, 131b are sloped relative to the thickness direction of the retaining member 13, as illustrated in FIG. 4. Meanwhile, when the retaining member 13 is wound around the honeycomb carrier 11 as in FIG. 2 and is pressed down by the inner faces of the sloped parts 121a, 121b of the case member 12 near both ends of the honeycomb carrier 11, respectively, the end faces 131a, 131b are substantially parallel to the center axis X of the carrier 11 as illustrated in FIG. 3. The tapered parts described earlier with reference to FIG. 3 are indicated by the same reference numerals 130a, 130b in the state of FIG. 4. The shape of the tapered part influences the effective width of an overlap allowance, which is the part to be caught when the honeycomb carrier 11 is retained. Details of the overlap allowance will be given later with reference to FIG. 5.

Next, effects of the exhaust gas purifying device as an embodiment of the aforementioned present disclosure will be described.

In the embodiment of the present disclosure, as can be easily understood by referring to FIGS. 2 and 3, the ends 13a, 13b of the retaining member 13 in the direction of the center axis X of the honeycomb carrier 11 form the tapered parts 130a, 130b. The tip end side of these tapered parts 130a, 130b extend to the sloped surfaces 112a, 112b of the honeycomb carrier 11. In other words, as referred in FIG. 2, the tapered parts 130a, 130b of the retaining member 13 extend to the sloped surfaces 112a, 112b of the respective outer circumferential edges of the inlet-side end face 110a and the outlet-side end face 110b of the honeycomb carrier 11.

For this reason, the retaining member 13 can retain the honeycomb carrier 11 firmly in the inner diameter direction and the center axis X direction.

Additionally, the tapered parts 130a, 130b of the retaining member 13 are longer on the side facing the case member 12 than on the side facing the honeycomb carrier 11. That is, in a part where the ends 13a, 13b bend toward the inner diameter direction along the sloped surfaces 112a, 112b of the honeycomb carrier 11, the retaining member 13 is relatively longer on the outer circumferential side at the bending part. Hence, dimensional shortage of the retaining member does not occur on the side in contact with the case member 12. Accordingly, even when there is some manufacturing variation in the dimension of the retaining member 13, the length of the part where the retaining member 13 is interposed between the sloped surface 112a of the honeycomb carrier 11 and the sloped part 121a of the case member 12 can be kept longer than a certain length. For this reason, a dimensional error in manufacturing of the retaining member 13 is less likely to be sufficient to impair the honeycomb carrier 11 retaining function of the retaining member 13.

Moreover, the end face 131a of the tapered part 130a is substantially parallel to the center axis X. Hence, it is possible to ensure the maximum so-called overlap allowance, which is a part to be caught when the honeycomb carrier 11 is retained by the sloped part 121a of the case member 12 with the retaining member 13 interposed therebetween. With this, the honeycomb carrier 11 can be reliably retained in the normal position in the case member 12.

In addition, since the end face 131a of the tapered part 130a is substantially parallel to the center axis X, collision of the exhaust gas stream into the retaining member 13 can be avoided. Hence, fear of pressure damage by the exhaust gas, and noise from flapping of the retaining member 13 (reinforced retaining member 15) can be eliminated.

Hereinafter, a detailed description will be given of an overlap allowance with reference to the drawings.

Figure 5:
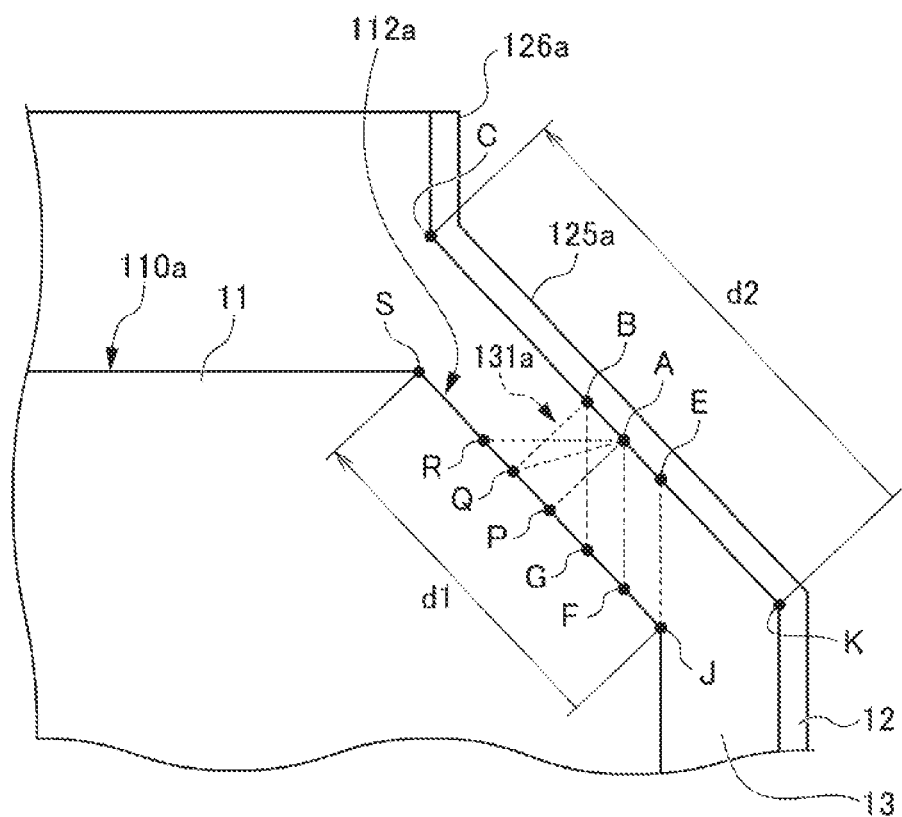
FIG. 5 is a conceptual diagram describing an overlap allowance in the embodiment of the present disclosure.

FIG. 5 is a conceptual diagram describing an overlap allowance in the embodiment of the present disclosure.

FIG. 5 conceptually shows a case where there are various modes of the overlap allowance, from substantially the same viewpoint as in FIG. 3. In FIG. 5, parts of the honeycomb carrier 11 and parts of the case member 12 are applied the same names and reference numerals as the corresponding parts in FIG. 3. In FIG. 5, reference numeral 131a inclusively indicates end faces, when there are various modes of the end face of the aforementioned tapered part 130a, as indicated by the broken line.

Additionally, parts in FIG. 5 used in the description of an overlap allowance are defined as follows. Note that although these parts in FIG. 5 are technically circumferential (linear), they are referred to as "point" for convenience of the description.

First, parts on the honeycomb carrier 11 side are assumed as follows.

Point J is one end of the sloped surface 112a where the radial diameter of the honeycomb carrier 11 decreases along the center axis X direction (i.e., the length of the outer circumferential edge of the honeycomb carrier 11 in the center axis X direction decreases), and is a part where the diameter starts to decrease.

Point S is a border between the sloped surface 112a and the end face 110a of the honeycomb carrier 11, and is the other end opposite to point J which is the one end of the sloped surface 112a.

Points F, G, P, Q, R are sequential parts when a distance d1 in a direction indicated by an arrow from point J to point S in FIG. 5 gradually increases on the sloped surface 112a.

Next, parts on the case member 12 are assumed as follows.

Point K is one end of a sloped surface part 125a where the radial diameter (inner diameter) of the case member 12 decreases along the center axis X direction, and is a part where the diameter starts to decrease.

Point C is a border between the sloped surface part 125a and a parallel surface part 126a of the case member 12, and is the other end opposite to point K which is the one end of the sloped surface part 125a.

Points E, A, B are sequential parts when a distance d2 in a direction indicated by an arrow from point K to point C in FIG. 5 gradually increases on the sloped surface part 125a of the case member 12.

Note that point E is a part where a line extending parallel to the center axis X from point J on the honeycomb carrier 12 side reaches the inner face of the case member 12.

As mentioned earlier, the end face 131a of the retaining member 13 forms the tapered part 130a that extends to the sloped surface 112a of the honeycomb carrier 11, and is longer in the center axis X direction on the side facing the case member 12 than on the side facing the honeycomb carrier 11. As illustrated in FIGS. 3 and 5, the end face 131a is substantially parallel to the direction of the center axis X of the honeycomb carrier 11.

In this case, a part where the end face 131a of the retaining member 13 extends in direction d1 (direction d2) from line JE connecting aforementioned point J and point E on the sloped surface 112a of the honeycomb carrier 11, is the overlap allowance of the retaining member 13.

When the end face 131a of the retaining member 13 is at line FA indicated by a broken line in FIG. 5, parallelogram JFAE is the overlap allowance in this case. Here, parallelogram JFAE is tentatively called a first overlap allowance.

Additionally, when the end face 131a of the retaining member 13 is at line BG indicated by a broken line in FIG. 5, parallelogram JGBE is the overlap allowance in this case. Here, parallelogram JGBE is tentatively called a second overlap allowance.

Although the position and slope (substantially parallel to center axis X in FIG. 3) of the end face 131a in FIG. 3 are one preferable mode, there are various conceivable shapes of the overlap allowance as a result of varying the position and slope of the end face 131a.

The inventor verified the retaining power and durability of the honeycomb carrier 11 for various modes of the overlap allowance through an experiment. A part of the experiment result will be explained below.

Figure 6:
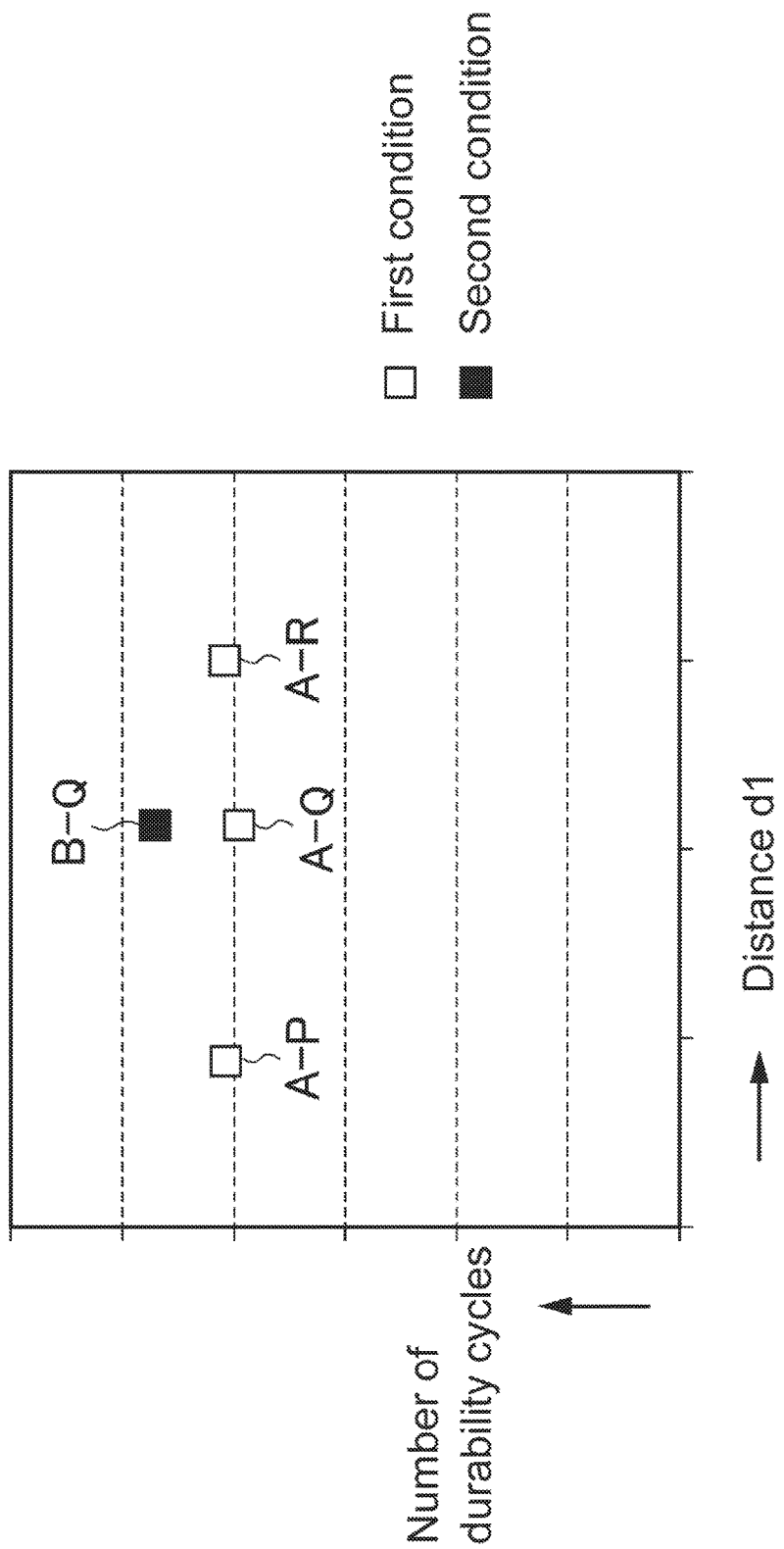
FIG. 6 is a diagram illustrating an experiment result regarding a correlation between the shape of an end part of the retaining member of FIG. 2 and the durability of the exhaust gas purifying device.

FIG. 6 is a diagram illustrating an experiment result regarding a correlation between the shape (mode of overlap allowance) of an end part of the retaining member of FIG. 2 and the durability of the exhaust gas purifying device.

In FIG. 6, the horizontal axis indicates distance d1 in FIG. 5. The vertical axis indicates the number of durability cycles. Here, "number of durability cycles" refers to the number of cycles performed before breakage of the retaining member 13, when a pulsed intermittent air stream simulating an exhaust gas stream is repeatedly blown to repeatedly apply a load on the honeycomb carrier 11.

The number of durability cycles was observed by acquiring data for each mode of the overlap allowance when the shape and dimension are varied under two conditions including a first condition and a second condition, and comparing the data as in FIG. 6.

Values indicated by a white square correspond to the number of durability cycles under the first condition, and a value indicated by a black square corresponds to the number of durability cycles under the second condition.

The first condition is a case where, in FIG. 5, the overlap allowance is set so that the end face 131a of the retaining member 13 is positioned at lines AP, AQ, AR, which extend from point A on the inner face of the sloped surface part 125a of the case member 12, to points P, Q, R on the sloped surface 112a of the honeycomb carrier 11.

Meanwhile, the second condition is a case where, in FIG. 5, the overlap allowance is set so that the end face 131a of the retaining member 13 is positioned at line BQ, which extends from point B on the inner face of the sloped surface part 125a of the case member 12, to point Q on the sloped surface 112a of the honeycomb carrier 11.

As indicated in the experiment result of FIG. 6, when point A which is one end of lines AP, AQ, AR is set to a position where distance d2 in FIG. 5 is smaller than that at point B as the first condition, the number of durability cycles becomes smaller than the overlap allowance under the second condition, even if the other end of the line is set to point R where distance d1 is larger than point Q.

That is, when point B which is one end of line BQ is set to a position where distance d2 in FIG. 5 is larger than that at point A as in the second condition, the number of durability cycles becomes larger than any of the modes of the overlap allowance under the first condition.

This indicates that the aforementioned second overlap allowance JGBE in FIG. 5 exceeds the first overlap allowance JFAE in the number of durability cycles. In other words, this indicates that the more parallel, and therefore relatively closer the end face 131a of the overlap allowance is kept to the center axis X, the larger the width dimension of the overlap allowance in the direction perpendicular to the center axis X becomes, to result in excellent retaining power of the honeycomb carrier 11 and number of durability cycles.

As has been described with reference to FIG. 6, it is clear that sufficient power to retain the honeycomb carrier 11 is maintained for a long period of time, in the embodiment of the present disclosure in which the end 13a of the retaining member 13 is longer in the center axis X direction of the honeycomb carrier 11 on the side facing the sloped surface part 125*a* of the case member 12 than on the side facing the sloped surface 112*a* of the honeycomb carrier 11. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. An exhaust gas purifying device of an internal combustion engine provided in an exhaust channel of the internal combustion engine to purify exhaust gas of the internal combustion engine, the exhaust gas purifying device comprising:
    a columnar honeycomb carrier in which a plurality of cells extending from an exhaust gas inlet-side end face of the honeycomb carrier to an outlet-side end face of the honeycomb carrier and serving as exhaust gas passages are separated and partitioned by a porous partition wall;
    a tubular case member that houses the honeycomb carrier therein; and
    a retaining member that surrounds an outer circumference of the honeycomb carrier and disposed between the honeycomb carrier and the case member, wherein:
    the honeycomb carrier includes, at an outer circumferential edge at each of the inlet-side end face and the outlet-side end face, a sloped surface sloped toward a direction in which the length in a center axis direction of the honeycomb carrier decreases; and
    the retaining member has an end in the center axis direction of the honeycomb carrier, the end extending to the sloped surface of the honeycomb carrier, and the end of the retaining member has a tapered part having a side facing the case member longer in the center axis direction of the honeycomb carrier than a side facing the honeycomb carrier.

2. The exhaust gas purifying device of an internal combustion engine according to claim 1, wherein
    an end face of the retaining member is substantially parallel to the center axis direction of the honeycomb carrier.

3. The exhaust gas purifying device of an internal combustion engine according to claim 1, wherein the sloped surface is sloped toward the center axis of the honeycomb carrier.

4. The exhaust gas purifying device of an internal combustion engine according to claim 1, wherein the tapered part has the side facing the case member longer in the center axis direction of the honeycomb carrier than the side facing the sloped surface.

5. The exhaust gas purifying device of an internal combustion engine according to claim 2, wherein the end face connects the side facing the case member and the side facing the honeycomb carrier.

6. The exhaust gas purifying device of an internal combustion engine according to claim 1, wherein the case member includes a sloped side wall portion sloped toward the center axis of the honeycomb carrier, the sloped side wall portion facing the sloped surface of the honeycomb carrier.

7. A vehicle comprising the exhaust gas purifying device of an internal combustion engine according to claim 1.

* * * * *